(12) United States Patent
Fukumoto

(10) Patent No.: US 12,352,864 B2
(45) Date of Patent: Jul. 8, 2025

(54) OBJECT DETECTION DEVICE AND OBJECT DETECTION METHOD

(71) Applicant: DENSO CORPORATION, Kariya (JP)

(72) Inventor: Harutsugu Fukumoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 1017 days.

(21) Appl. No.: 17/359,974

(22) Filed: Jun. 28, 2021

(65) Prior Publication Data

US 2021/0325539 A1 Oct. 21, 2021

Related U.S. Application Data

(63) Continuation of application No. PCT/JP2019/044126, filed on Nov. 11, 2019.

(30) Foreign Application Priority Data

Dec. 27, 2018 (JP) ................................. 2018-243863

(51) Int. Cl.
*G01S 17/89* (2020.01)
*G01S 17/93* (2020.01)

(52) U.S. Cl.
CPC .............. *G01S 17/89* (2013.01); *G01S 17/93* (2013.01)

(58) Field of Classification Search
CPC ........ G01S 17/89; G01S 17/93; G01S 7/4816; G01S 7/484; G01S 7/4876; G01S 7/4911; G01S 7/493; G01S 17/42; G01S 17/931; G01S 7/497

USPC ......................................................... 356/3.13
See application file for complete search history.

(56) References Cited

U.S. PATENT DOCUMENTS

| | | | |
|---|---|---|---|
| 2014/0132721 | A1 | 5/2014 | Martinez Bauza et al. |
| 2014/0132722 | A1 | 5/2014 | Martinez Bauza et al. |
| 2015/0226553 | A1 | 8/2015 | Fuchikami et al. |
| 2016/0098841 | A1 | 4/2016 | Sekiguchi et al. |
| 2016/0103210 | A1 | 4/2016 | Ochimizu et al. |

FOREIGN PATENT DOCUMENTS

| | | |
|---|---|---|
| JP | 2016-75658 A | 5/2016 |
| JP | 2016-166814 A | 9/2016 |
| JP | 2017-173298 A | 9/2017 |

*Primary Examiner* — Daniel L Murphy
(74) *Attorney, Agent, or Firm* — Maschoff Brennan

(57) ABSTRACT

An object detection device includes a light emitting section that radiates detection light, a light receiving section that includes a plurality of pixels and outputs pixel values of the respective pixels corresponding to intensity of incident light, an irradiation control section that causes the light emitting section to radiate the detection light with predetermined reference intensity or at least one discrimination intensity different from the reference intensity, a specification section that specifies the pixels whose pixel value, which is output from the light receiving section depending on irradiation with the reference intensity and irradiation with the discrimination intensity, has changed, and an identification section that identifies an object by using the pixel value, which concerns the specified pixel, included in the pixel values output from the receiving section depending on the irradiation with the reference intensity.

5 Claims, 8 Drawing Sheets

OBJECT DETECTION DEVICE AND OBJECT DETECTION METHOD

CROSS-REFERENCE TO RELATED APPLICATION

The present application is based on and claims the benefit of priority from earlier Japanese Patent Application No. 2018-243863 filed Dec. 27, 2018, the description of which is incorporated herein by reference.

BACKGROUND

Technical Field

The present disclosure relates to a control technique for an object detection device using a laser beam.

Related Art

Techniques for detecting an object by using a laser beam are proposed.

SUMMARY

As an aspect of the present disclosure, an object detection device is provided. The device includes: a light emitting section that radiates detection light; a light receiving section that includes a plurality of pixels and outputs pixel values of the respective pixels corresponding to intensity of incident light; an irradiation control section that causes the light emitting section to radiate the detection light with predetermined reference intensity or at least one discrimination intensity different from the reference intensity; a specification section that specifies the pixels whose pixel value, which is output from the light receiving section depending on irradiation with the reference intensity and irradiation with the discrimination intensity, has changed; and an identification section that identifies an object by using the pixel value, which concerns the specified pixel, included in the pixel values output from the receiving section depending on the irradiation with the reference intensity.

DETAILED DESCRIPTION OF THE PREFERRED EMBODIMENTS

JP 2016-166814 A and JP 2017-173298 A propose techniques for detecting an object by using a laser beam.

However, the above techniques have a problem that when intensity of reflected light that is generated by reflection of radiated detection right from an object and intensity of disturbance light whose light source is the sun or the like are the identical or approximate to each other, pixels that have received the disturbance light and pixels that have received the reflected light cannot be distinguished from each other. If the disturbance light and the reflected light cannot be distinguished from each other, the object is detected by using all the pixels, which decreases accuracy in detection.

Hence, it is required to reduce or eliminate influence of disturbance light to improve accuracy in detecting an object.

Hereinafter, embodiments of an object detection device and an object detection method will be described.

First Embodiment

Figure 1:
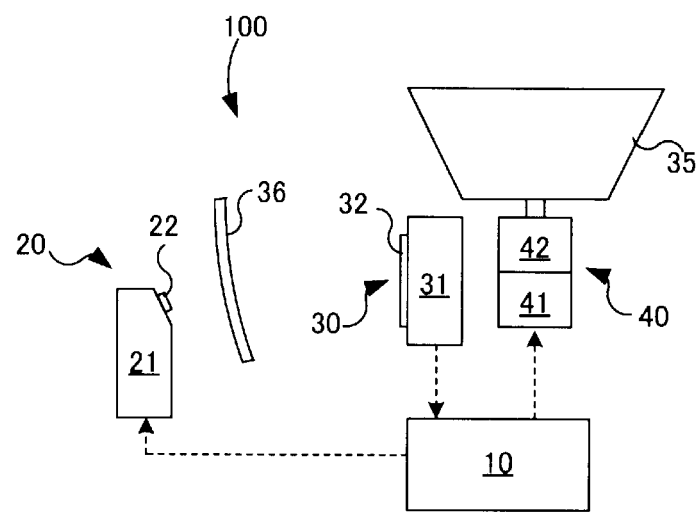
FIG. 1 is a diagram illustrating a schematic configuration of an object detection device according to a first embodiment.
Figure 2:
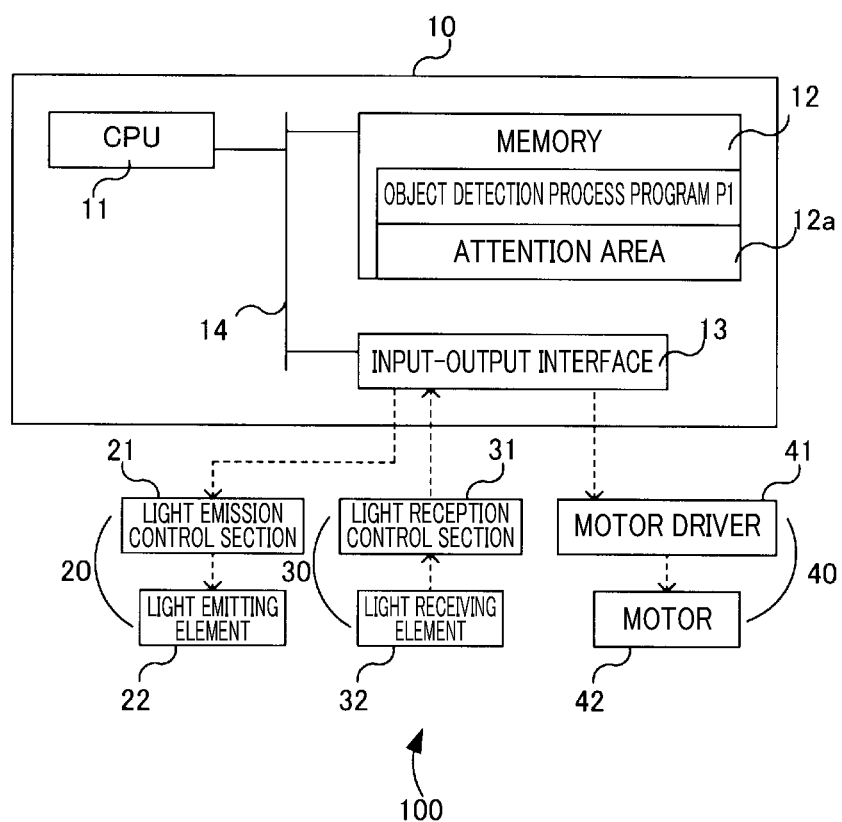
FIG. 2 is a block diagram illustrating a functional configuration of a control section of the object detection device according to the first embodiment.

As shown in FIG. 1, an object detection device 100 according to the first embodiment includes a control section 10, a light emitting section 20, a light receiving section 30, and an electric drive section 40. The object detection device 100 is, for example, installed in a vehicle and is used to detect an object around the vehicle. The result of the detection of the object is used as a determination parameter for drive assistance such as driving force control, braking assistance, and steering assistance. The object detection device 100 may include at least the control section 10, the light emitting section 20, and the light receiving section 30. The object detection device 100 is, for example, Lidar (Light Detection and Ranging) and includes a scanning mechanism 35 that is driven to rotate by the electric drive section 4 and a half mirror 36 that transmits a laser beam radiated from the light emitting section 20 and reflects incident light.

The control section 10 includes a central processing unit (CPU) 11 serving as a calculation section, a memory 12 serving as a storage section, an input-output interface 13 serving as an input-output section, and a clock generator, not shown. The CPU 11, the memory 12, the input-output interface 13, and the clock generator are connected via an internal bus 14 so as to be able to interactively communicate with each other. The memory 12 includes a memory, which stores an object detection process program P1 for detecting an object as a target, with a non-volatile and read-only manner, for example, a ROM, and a memory that is readable and writable by the CPU 11, for example, a RAM. The readable and writable memory or area of the memory 12 includes an attention area storage area 12a that stores pixel information on specific pixels used for detection an object. The pixel information may be coordinate information for specifying a pixel position or a dentification number when the dentification number is added to the pixel. The pixel information may further include a luminance value as a pixel value and a characteristic value such as brightness. The CPU 11 develops the object detection process program P1 stored in the memory 12 on a readable and writable memory to execute the object detection process program P1, thereby functioning as a radiation control section, a specification section, and an identification section. The CPU 11 may be a single CPU or include a plurality of CPUs that execute respective programs. The CPU 11 may be a multitask-type CPU that is capable of executing a plurality of programs simultaneously. The control sections implementing the radiation control section, the specification section, and the identification section may be separated or combined optionally.

The input-output interface 13 is connected with a light emission control section 21, a light reception control section 31, and a motor driver 41 via respective control signal lines. The input-output interface 13 transmits an emission control signal to the light emission control section 21, receives an incident light intensity signal from the light reception control section 31, and transmits a rotational speed instruction signal to the motor driver 41.

The light emitting section 20 includes the light emission control section 21 and a light-emitting element 22 and radiates detection light. The light-emitting element 22 is, for example, an infrared laser diode and radiates an infrared laser beam as the detection light. The light emission control section 21 drives the light-emitting element 22 so as to radiate the infrared laser beam with emission intensity according to an emission control signal received from the control section 10 through the input-output interface 13. One light-emitting element 22 or a plurality of light-emitting elements 22 may be provided. If a plurality of light-emitting elements 22 are provided, for example, scanning in the vertical direction may be omitted. In the present embodiment, the emission intensity indicated by the emission control signal is predetermined reference intensity used for detecting an object or discrimination intensity, which is different from the reference intensity, that is, higher or lower than the reference intensity. The emission intensity of the light emitting section 20 is desirably the maximum emission intensity within a range that meets safety standards for laser beams.

The light receiving section 30 includes the light reception control section 31 and a light receiving array 32. The light receiving array 32 is a flat plate-like optical sensor in which a plurality of pixels are arranged in the longitudinal and lateral directions. For example, each of the pixels is configured by, a SPAD (Single Photon Avalanche Diode) or another photodiode. The light reception control section 31 outputs, as incident light intensity signals, pixel values corresponding to incident light quantity or incident light intensity of light received by the respective pixels. Specifically, the light receiving section 30 converts a current generated in each of the pixels depending on the incident light quantity into a voltage, and outputs the voltage as a pixel value, for example, an incident light intensity signal indicating a luminance value or brightness, to the control section 10.

The electric drive section 40 includes the motor driver 41 and a motor 42. The motor driver 41 receives the rotational speed instruction signal from the control section 10 to change voltage applied to the motor 42 to control rotational speed of the motor 42. The motor 42 is, for example, a brushless motor or a brush motor. The scanning mechanism 35 is attached to the end portion of the output shaft of the motor 42. The scanning mechanism 35 is a reflector that causes a laser beam radiated from the light-emitting element 22 to be subjected to scanning in the horizontal direction, that is, a mirror. The scanning mechanism 35 is driven to rotate by the motor 42 to achieve scanning in the horizontal direction. The scanning mechanism 35 may be a polygon mirror for achieving scanning in the vertical direction as well as the horizontal direction. Alternatively, the scanning mechanism 35 may include a mirror having a single face and a mechanism swung in the vertical direction or another mirror having a single face swung in the vertical direction.

The laser beam radiated from the light emitting section 20 is transmitted through the half mirror 36 and is caused to be subjected to scanning through the scanning mechanism 35, for example, within a predetermined scanning range in the horizontal direction, that is, over a rotation angle. The laser beam reflected from an object passes in the same optical path as irradiation light and is reflected by the half mirror 36 to enter the light receiving section 30. As a result, scanning for detecting an object can be performed over a desired scanning range. The light emitting section 20 and the light receiving section 30 may be rotated with the scanning mechanism 35 by the motor 42. The light emitting section 20 and the light receiving section 30 are separated from the scanning mechanism 35 and may not be rotated with the scanning mechanism 35 by the motor 42. In addition, the scanning mechanism 35 may not be provided, but a plurality of light-emitting elements 22 arranged in the form of an array and the light receiving array 32 may be provided to directly radiate a laser beam outward and directly receive reflected light.

Figure 3:
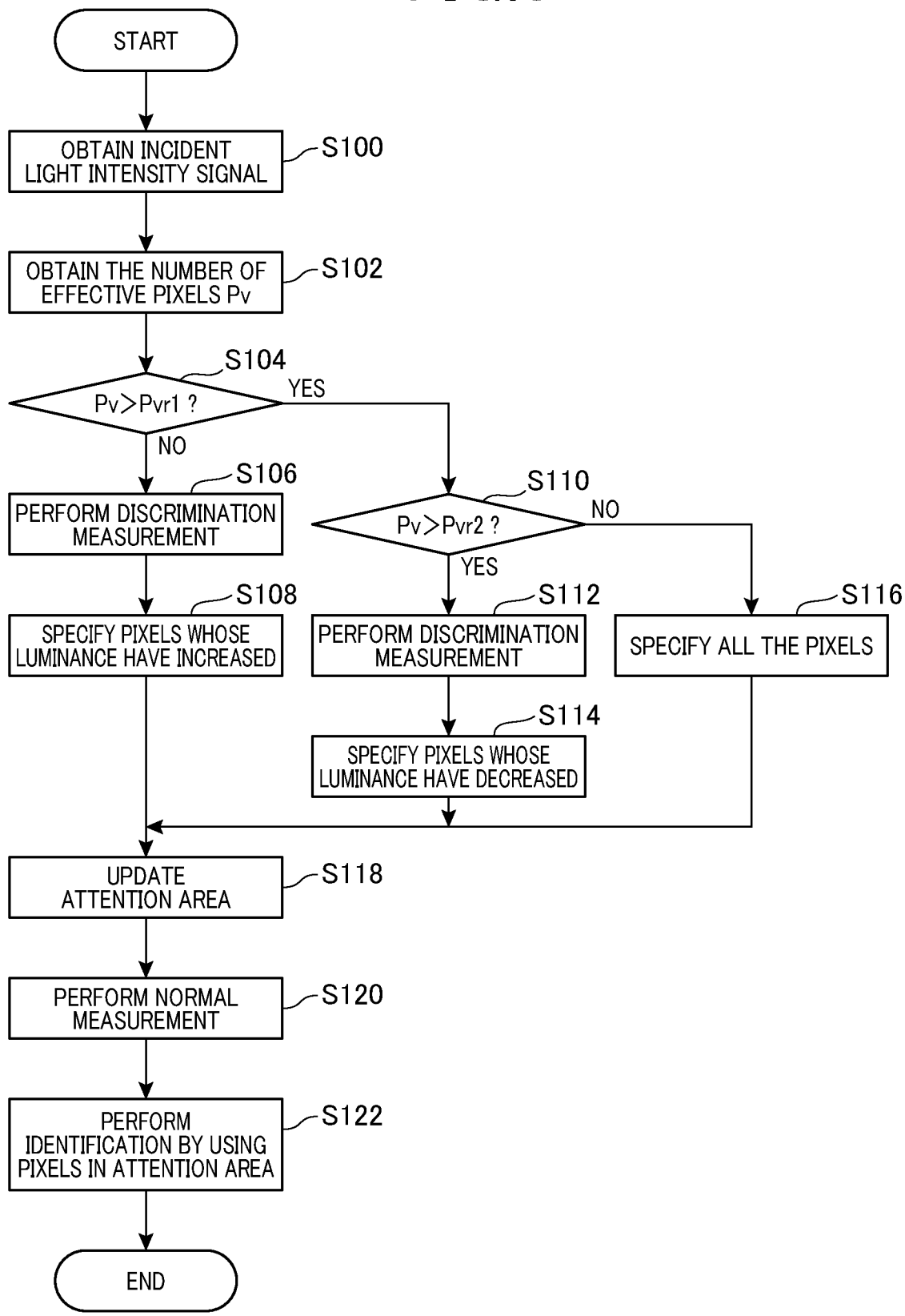
FIG. 3 is a flowchart of an object detection process performed by the object detection device according to the first embodiment.

Referring to FIG. 3, the object detection device 100, more specifically, an object detection process performed by the control section 10 will be described. The flowchart shown in FIG. 3 is, for example, repeatedly performed at predetermined intervals, for example, a few milliseconds after the object detection device 100 is started. When the object detection device 100 is installed in a vehicle, the flowchart is repeatedly performed at predetermined intervals, for example, a few milliseconds after a system of the vehicle is started and until the system is completed, or during a time period during which a start switch of the object detection device 100 is in an on state.

Figure 4:
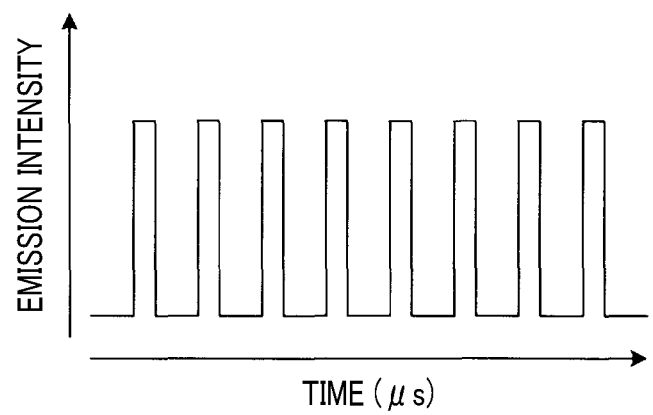
FIG. 4 is a diagram illustrating an example of an emission control signal transmitted to a light emitting section to cause the light emitting section to radiate detection light having reference intensity.
Figure 5:
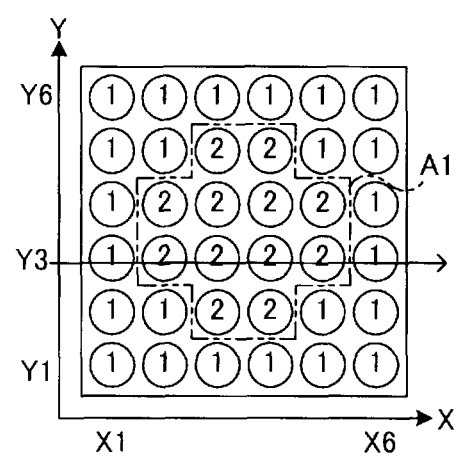
FIG. 5 is a diagram illustrating an example of a group of pixels when the detection light having reference intensity is radiated.
Figure 6:
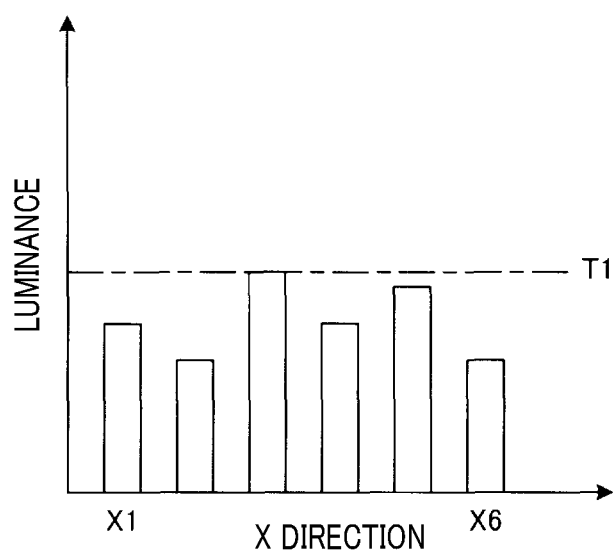
FIG. 6 is a diagram illustrating an example of a luminance value obtained by radiating the detection light having reference intensity.

The control section 10 outputs an emission control signal for achieving the reference intensity for normal measurement shown in FIG. 4, to the light emitting section 20, and receives an incident light intensity signal from the light receiving section 30 depending on irradiation of a laser beam from the light emitting section 20 (step S10). The reference intensity is emission intensity set so as to be able to receive reflected light having sufficient intensity from an object considering the difference in intensity between disturbance light and reflected light under the typical environment. The control section 10 obtains, as the number of effective pixels Pv, the number of pixels whose luminance value is equal to or more than a luminance threshold T1, which is a discrimination reference value, among pixels configuring the light receiving array 32 by using the received incident light intensity signals, that is, luminance values of the pixels. Specifically, as shown FIG. 5, the control section 10 obtains luminance values of pixels in a Y row unit of the light receiving array 32 consisting of a group of pixels of X six columns*Y six rows and counts the number of pixels whose luminance value is equal to or more than a luminance threshold T1 among the obtained pixels. In the example in FIG. 5, a pixel row in Y3 row is selected. In FIG. 5, pixels denoted by "1" indicate pixels that disturbance light has entered, pixels denoted by "2" indicate pixels that reflected light of a radiated laser beam having reference intensity and disturbance light have entered, and an area A1 indicates an area in which an object to be a detection target is present. FIG. 6 illustrates an example of luminance values of pixels of X1 to X6 columns in Y3 row in FIG. 5. In FIG. 6, luminance values of pixels other than the pixels in X3 are less than the luminance threshold T1. The luminance threshold T1 is a reference value for determining the magnitude of intensity of reflected light reflected from an object depending on irradiation of laser light. In discrimination measurement in the subsequent stage, intensity of reflected light from an object is determined based on the number of effective pixels Pv, and irradiation of laser light is performed at different discrimination intensity obtained by considering influence of disturbance light on the intensity of the reflected light. The luminance threshold T1 may be a fixed value previously determined by considering detection characteristics of the light receiving array 32 for disturbance light, or may be an average value, the maximum value, or the minimum value of previous luminance values used to obtain the previous number of effective pixels Pv, or a value obtained by multiplying the previous luminance value by a coefficient. The characteristics shown in FIG. 6 are found, for example, when the target is far and the difference in intensity between reflected light of detection light and disturbance light is small.

The control section 10 determines whether the number of effective pixels Pv is more than a first reference number of pixels Pvr1, which is a first reference value, that is, Pv>Pvr1 (step S104). The determination may be made based on whether a ratio of pixels represented by Pv/Pvr1, instead of the number of pixels, is more than a predetermined reference value. The first reference number of pixels Pvr1 is a threshold used for determining whether intensity of reflected light is so low that the reflected light affects accuracy in identifying an object, that is, whether intensity of reflected light is so low that the reflected light is affected by disturbance light, by using luminance values of pixels of the group of pixels, more specifically, the number of pixels or a ratio of pixels whose luminance values are the discrimination reference value or more. For six pixels, the first reference number of pixels Pvr1 may be, for example, 0 or 1, or 2 or more, and may be 5% or 10%, which is a ratio.

Figure 7:
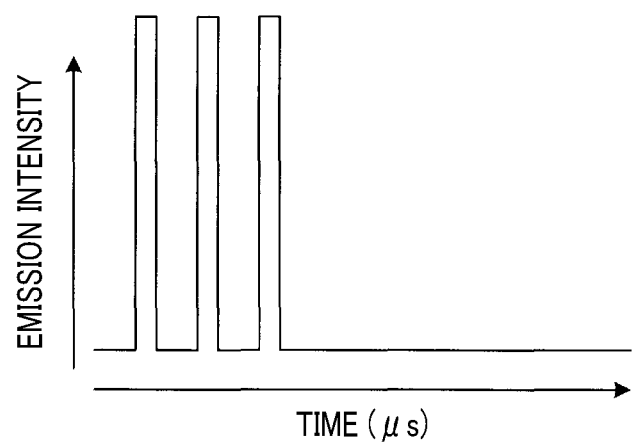
FIG. 7 is a diagram illustrating an example of the emission control signal transmitted to the light emitting section to cause the light emitting section to radiate detection light having high discrimination intensity.
Figure 8:
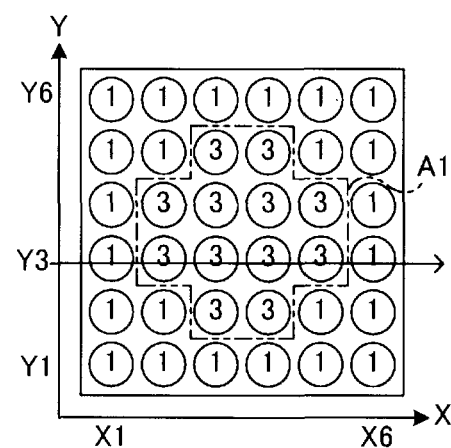
FIG. 8 is a diagram illustrating an example of a group of pixels when the detection light having discrimination intensity is radiated.
Figure 9:
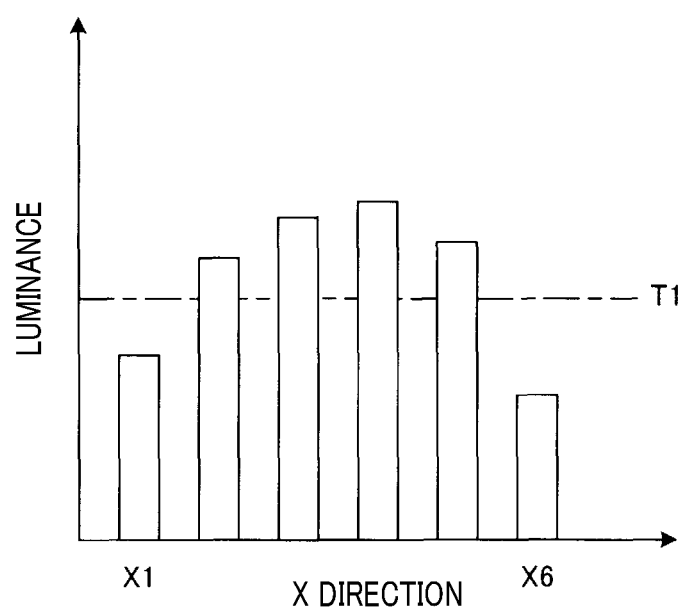
FIG. 9 is a diagram illustrating an example of a luminance value obtained by radiating the detection light having discrimination intensity.

If the control section 10 determines that Pv>Pvr1 is not met (step S104: No), that is, the number of effective pixels Pv is the first reference number of pixels Pvr1 or less, the control section 10 determines that intensity of the reflected light is so low that the reflected light affects accuracy in identifying an object and performs discrimination measurement using irradiation of a laser beam with discrimination intensity higher than the reference intensity (step S106). The discrimination intensity higher than the reference intensity may be two or three times the reference intensity, or 1.2 or 1.5 times the reference intensity. In the discrimination measurement, the control section 10 transmits an emission control signal for radiating a laser beam with discrimination intensity higher than reference intensity illustrated in FIG. 7, to the light emitting section 20. The control section 10 specifies pixels whose luminance values have increased in the light receiving array (step S108) and proceeds to step S118. The variation in a luminance value indicates increase in the luminance value corresponding to irradiation of a laser beam due to the discrimination intensity higher than the reference intensity. For example, as shown in FIG. 8, the control section 10 obtains luminance values of pixels in a Y row unit of the light receiving array 32 consisting of a group of pixels of X six columns*Y six rows and specifies the pixels, whose luminance value has increased with respect to the luminance value obtained in step S100, among the obtained pixels. In the example in FIG. 8, a pixel row in Y3 row is selected. In FIG. 8, pixels denoted by "1" indicate pixels that disturbance light has entered, pixels denoted by "3" indicate pixels that reflected light of a radiated laser beam with discrimination intensity and disturbance light have entered, and an area A1 indicates an area in which an object to be a detection target is present. FIG. 9 shows an example of luminance values of pixels of X1 to X6 columns in Y3 row in FIG. 8. In FIG. 9, luminance values of pixels other than the pixels in X1 and X6 have increased.

Figure 10:
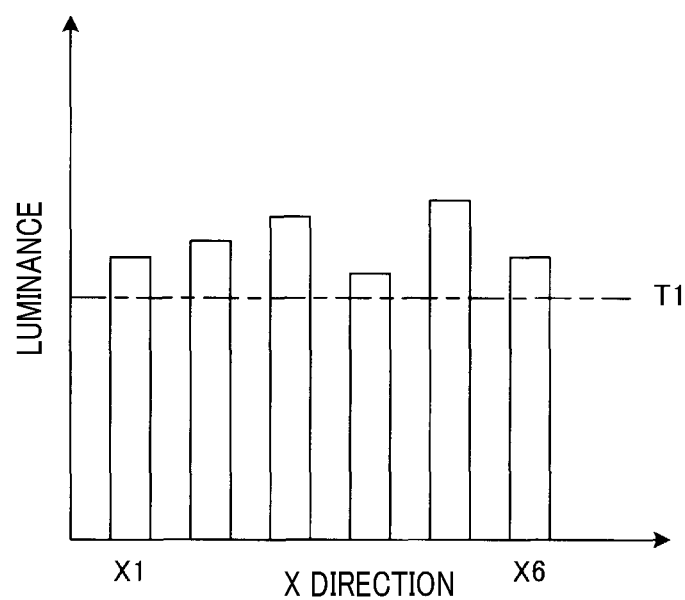
FIG. 10 is a diagram illustrating an example of a luminance value obtained by radiating the detection light having reference intensity.

If the control section 10 determines that the number of effective pixels Pv is more than the first reference number of pixels Pvr1, that is, Pv>Pvr1 is met (step S104: Yes), the control section 10 determines that intensity of the reflected light is not so low that the reflected light affects accuracy in identifying an object and determines whether the number of effective pixels Pv is more than the second reference number of pixels Pvr2, which is a second reference value, that is Pv>Pvr2 is met (step S110). Specifically, if luminance values shown in FIG. 10 are obtained from the group of pixels shown in FIG. 5, the control section 10 determines that Pv>Pvr1 and Pv>Pvr2 are met. FIG. 10 illustrates an example of luminance values of pixels of X1 to X6 columns in Y3 row in FIG. 5. The luminance values of all the pixels are more than the luminance threshold T1. The characteristics shown in FIG. 10 are found, for example, when the target is near and the difference in intensity between reflected light of detection light and disturbance light is small. The determination may be made based on whether a ratio of pixels represented by Pv/Pvr2, instead of the number of pixels, is more than a predetermined reference value. The second reference number of pixels Pvr2 is a threshold used for determining whether intensity of reflected light is so high that the reflected light affects accuracy in identifying an object, that is, whether intensity of the reflected light is so high that the reflected light is affected by disturbance light, by using luminance values of pixels of the group of pixels, more specifically, by using the number of pixels or a ratio of pixels whose luminance values are the discrimination reference value or more. For six pixels, the second reference number of pixels Pvr2 may be, for example, 5 or 6, or 4 or less, and may be 90% or 80%, which is a ratio. The first reference number of pixels Pvr1 and the second reference number of pixels Pvr2 are different from each other, and are determined so that Pv meeting Pvr1<Pv<Pvr2 is present, that is, a condition that intensity of reflected light achieves desired accuracy in identifying an object is present.

Figure 11:
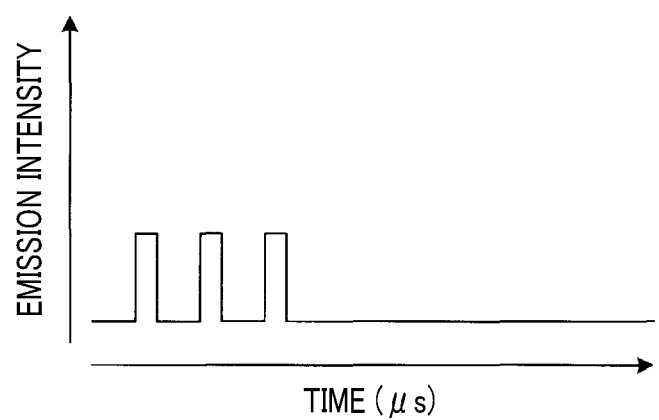
FIG. 11 is a diagram illustrating an example of the emission control signal transmitted to the light emitting section to cause the light emitting section to radiate detection light having low discrimination intensity.
Figure 12:
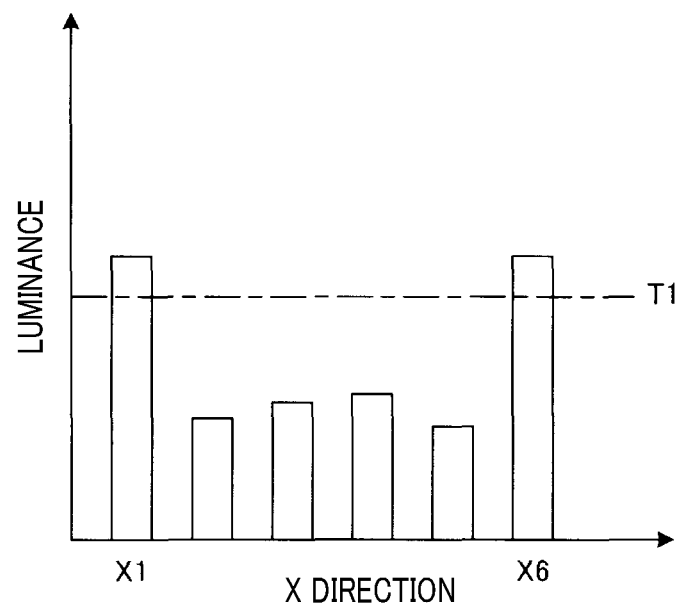
FIG. 12 is a diagram illustrating an example of a luminance value obtained by radiating the detection light having discrimination intensity.

If the control section 10 determines that Pv>Pvr2 is met (step S110: Yes), the control section 10 determines that intensity of the reflected light is so high that the reflected light affects accuracy in identifying an object and performs discrimination measurement using irradiation of a laser beam with discrimination intensity lower than reference intensity (step S112). The discrimination intensity lower than the reference intensity may be ½ or ⅓ times the reference intensity, or 0.9 or 0.95 times the reference intensity. In the discrimination measurement, the control section 10 transmits an emission control signal for radiating a laser beam with discrimination intensity lower than reference intensity illustrated in FIG. 11, to the light emitting section 20. The control section 10 specifies pixels whose luminance values have decreased in the light receiving array (step S114) and proceeds to step S118. The variation in the luminance value indicates decrease in the luminance value corresponding to irradiation of a laser beam due to the discrimination intensity lower than the reference intensity. For example, as shown in FIG. 8, the control section 10 obtains luminance values of pixels in a Y row unit of the light receiving array 32 consisting of a group of pixels of X six columns*Y six rows and specifies pixels, whose luminance value has decreased with respect to the luminance value obtained in step S100, among the obtained pixels. FIG. 12 shows an example of luminance values of pixels of X1 to X6 columns in Y3 row in FIG. 8. In FIG. 12, luminance values of pixels other than the pixels in X1 and X6 have decreased.

If the control section 10 determines that Pv>Pvr2 is not met, that is, the number of effective pixels Pv is the second reference number of pixels Pvr2 or less (step S110: No), the control section 10 specifies all the pixels of the group of pixels (step S116) and proceeds to step S118. If Pvr1<Pv≤Pvr2 is met, an object can be identified with desired accuracy by irradiation of a laser beam with the reference intensity without specifying pixels with the discrimination intensity. Hence, the control section 10 specifies all the pixels included in the group of pixels as pixels used for identifying an object. Instead of specifying all the pixels in step S116, a step in which the attention area storage area 12a is not referred may be applied.

The control section 10 updates an attention area stored in the attention area storage area 12a by using pixel information on specified pixels (step S118) and performs normal measurement using the reference intensity (step S120). The attention area storage area 12a is for storing pixel information on specified pixels. The attention area is an area on the light receiving array defined by specified pixels, that is, an area on which target pixels used for identifying an object are present.

Figure 13:
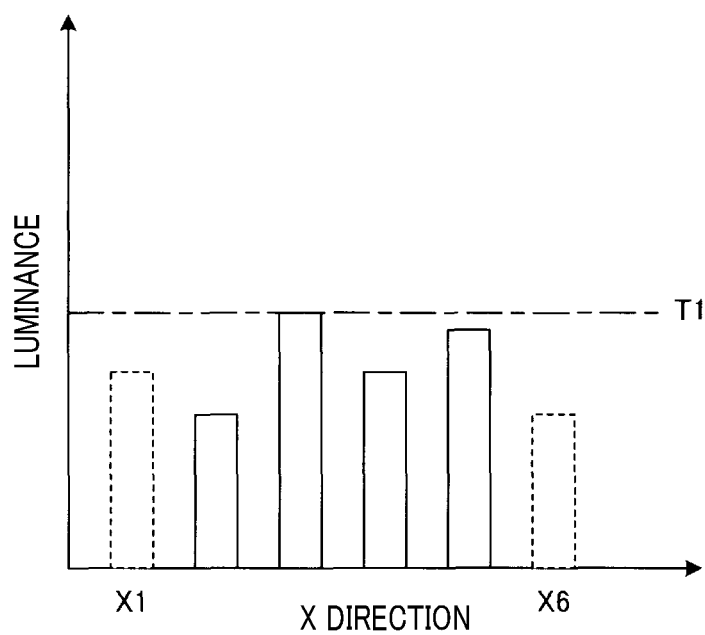
FIG. 13 is a diagram illustrating an example of object identification using specific pixels performed by radiating the detection light having high discrimination intensity.
Figure 14:
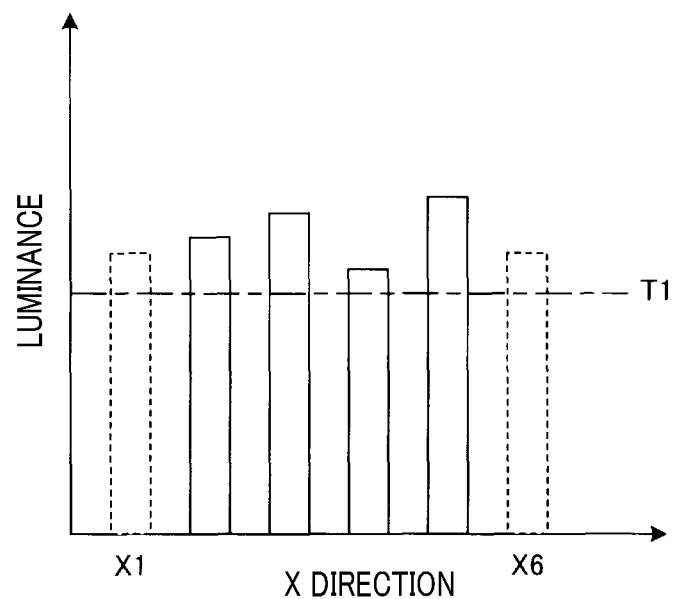
FIG. 14 is a diagram illustrating an example of object identification using specific pixels performed by radiating the detection light having low discrimination intensity.

The control section 10 obtains luminance values of the pixels corresponding to reflected light obtained by irradiation of a laser beam with the reference intensity to detect an object by using the pixels in the attention area, that is, perform a process for identifying an object (step S122), and ends the present process. In the process for identifying an object, it is preferable to perform the discrimination process using a statistical value such as an average value, a median value, or a mode value of multiple detection results to improve accuracy in identifying an object. Specifically, when information on pixels specified in step S108 is stored in the attention area storage area 12a, as shown in FIG. 13, identification of an object is performed without using pixels of X1 and X6 in Y3 row whose luminance values have not increased or without using pixel values of X1 and X6. When information on pixels specified in step S114 is stored in the attention area storage area 12a, as shown in FIG. 14, identification of an object is performed without using pixels of X1 and X6 in Y3 row whose luminance values have not decreased or without using pixel values of X1 and X6. As a result, influence of disturbance light is reduced or eliminated, whereby the control section 10 can measure a distance to an object by using only reflected light from the object that has received a radiated laser beam with the reference intensity to determine presence or absence of a three-dimensional object, identify the shape of the object, and identify the type of the object based on the shape of the object, by using reflecting points of the reflected object on the object. To maintain or increase accuracy in identifying an object, it is desirable that pixels for discrimination and pixels for identification correspond to each other, and it is desirable that an azimuth angle used when irradiation is performed using the discrimination intensity and an azimuth angle used when the identification process for an object is performed using the reference intensity are the same or substantially the same.

According to the object detection device 100 according to the first embodiment described above, pixels whose pixel values output from the light receiving section 30 have changes depending on irradiation with the reference intensity and irradiation with the discrimination intensity are specified, and an object is identified by using pixel values concerning the specified pixels among the pixel values output from the light receiving section 30 depending on the irradiation with the reference intensity. Hence, influence of disturbance light can be reduced or eliminated to improve accuracy in detecting an object. That is, the pixels whose pixel values vary depending on the change in intensity of detection light can be identified as pixels that have received disturbance light and reflected light, and the pixels whose pixel values do not vary depending on the intensity of detection light can be identified as pixels that have received only disturbance light. Hence, even when an object to be a detection target is far from the own vehicle, and intensity of reflected light with respect to detection light with the reference intensity is low, whereby it is difficult to distinguish the reflected light from the disturbance light, or even when an object to be a detection target is near the own vehicle, and intensity of reflected light with respect to detection light with the reference intensity is high, whereby it is difficult to distinguish the reflected light from the disturbance light, influence of the disturbance light can be reduced or eliminated to improve accuracy in detecting an object. In addition, even when an object to be a detection target is far from the own vehicle, the object can be detected with high accuracy without increasing the reference intensity. Hence, the increase in power consumption due to the increase in the reference intensity can be suppressed.

According to the above first embodiment, one type of intensity that is lower or higher than the reference intensity is used as the discrimination intensity. However, a plurality of types of intensity may be used, which can address a plurality of types of intensity of disturbance light. In addition, using a plurality of discrimination reference values and using discrimination intensity corresponding to the discrimination reference values can detect on object depending on the environment, that is, depending on the intensity of disturbance light more appropriately, which can further improve accuracy in detection.

Figure 15:
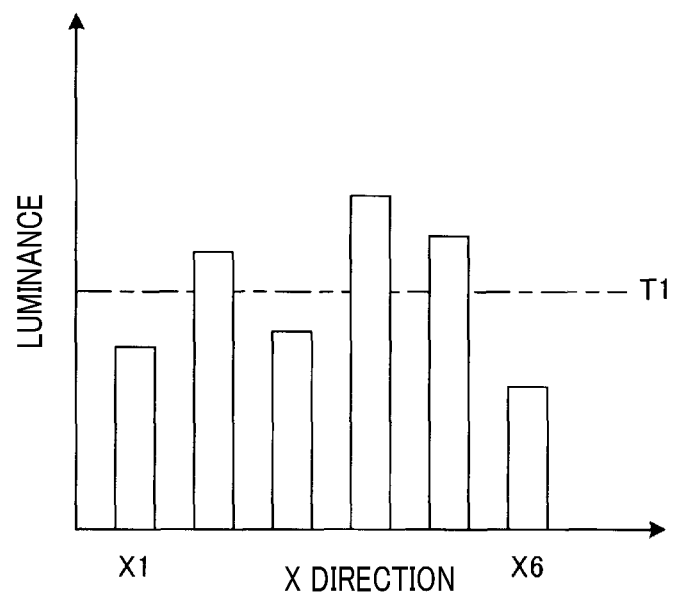
FIG. 15 is a diagram illustrating an example of discontinuous specific pixels.

OTHER EMBODIMENTS (1) In the first embodiment, the process for identifying an object using specific pixels is performed without considering characteristics of pixel values stored in the attention area storage area 12a, for example, continuity and reliability. In contrast, as shown in FIG. 15, for example, when the pixel of X3 included in the pixels of X2 to X5 is not specified, and a plurality of pixels continuing in the X direction are not specified as specified pixels, that is, when the distribution of the specified pixels is discontinuous, information on the specified pixels in the attention area storage area 12*a* may be abandoned or deleted. If the number of specified pixels stored in the attention area storage area 12*a* is less than the predetermined number, information on the specified pixels in the attention area storage area 12*a* may be abandoned or deleted. Furthermore, if a variance or a standard deviation of positions of the specified pixels stored in the attention area storage area 12*a*, that is, rows of pixels in the x direction in the respective Y rows is a predetermined value or more, information on the specified pixels in the attention area storage area 12*a* may be abandoned or deleted. In these cases, it can be considered that the specific pixels stored in the attention area storage area 12*a* have low reliability. Not using the specific pixels for identifying or detecting an object as noise components can improve or maintain accuracy in identifying an object and reliability of detection.

(2) In the first embodiment, if the number of effective pixels Pv is less than the first reference number of pixels Pvr1, or if the number of effective pixels Pv is not less than the first reference number of pixels Pvr1 and not less than the second reference number of pixels Pvr2, the discrimination measurement using the discrimination intensity is performed. However, the discrimination measurement may be performed at predetermined time intervals without considering the magnitude of the number of effective pixels Pv or with considering the number of effective pixels Pv. In this case, for example, a laser beam with high discrimination intensity may be radiated first, and then a laser beam with low discrimination intensity may be radiated, and vice versa. Performing the discrimination measurement at predetermined time intervals can improve reliability of the discrimination measurement.

(3) In the above embodiments, the control section 10 executes a program to achieve a control section performing various processes including a process for specifying pixels and a process for identifying an object by software. However, the control section 10 may be achieved by hardware using a preprogrammed integrated circuit or a discrete circuit. That is, the control section and the method thereof of the above embodiments may be implemented by a dedicated computer provided by configuring a processor programmed to execute one or more functions embodied by computer programs and a memory.

Alternatively, the control section and the method thereof described in the present disclosure may be implemented by a dedicated computer provided by configuring a processor by one or more dedicated hardware logic circuits. Alternatively, the control section and the method thereof described in the present disclosure may be implemented by one or more dedicated computers configured by combining a processor programmed to execute one or more functions and a memory, with a processor configured by one or more hardware logic circuits. The computer programs may be stored in a computer-readable non-transitional tangible storage medium as instructions executed by the computer.

The embodiments described above are for facilitating understanding the present disclosure and do not limit the present disclosure. The present disclosure can be changed and modified without departing from the spirit of the present disclosure. The present disclosure includes equivalents of them. For example, the technical features of the embodiments and the modifications may be replaced or combined as appropriate to solve part or all of the above-described problems or achieve part or all of the above-described effects. When a technical feature is not described as an essential feature herein, it can be removed as appropriate.

The present disclosure can be implemented as the following aspects.

A first aspect provides an object detection device. The object detection device according to the first aspect includes: a light emitting section (20) that radiates detection light; a light receiving section (30) that includes a plurality of pixels and outputs pixel values of the respective pixels corresponding to intensity of incident light; an irradiation control section (11) that causes the light emitting section to radiate the detection light with predetermined reference intensity or at least one discrimination intensity different from the reference intensity; a specification section (11) that specifies the pixels whose pixel value, which is output from the light receiving section depending on irradiation with the reference intensity and irradiation with the discrimination intensity, has changed; and an identification section (11) that identifies an object by using the pixel value, which concerns the specified pixel, included in the pixel values output from the receiving section depending on the irradiation with the reference intensity.

According to the object detection device of the first aspect, influence of disturbance light can be reduced or eliminated to improve accuracy in detecting an object.

A second aspect provides an object detection method. The object detection method according to the second aspect includes: radiating detection light with predetermined reference intensity; radiating the detection light with at least one discrimination intensity different from the reference intensity; receiving incident light by a light receiving section including a plurality of pixels, and specifying the pixels whose pixel value has changed depending on intensity of the incident light due to irradiation with the reference intensity and irradiation with the discrimination intensity; and identifying an object by using the pixel value, which concerns the specified pixel, included in the pixel values output from the receiving section depending on the irradiation with the reference intensity.

According to the object detection method of the second aspect, influence of disturbance light can be reduced or eliminated to improve accuracy in detecting an object. The present disclosure can be implemented as an object detection program or a computer readable storage medium that stores the program.

What is claimed is:

1. An object detection device, comprising:
a light emitting section that radiates detection light;
a light receiving section that includes a plurality of pixels and outputs pixel values of respective pixels of the plurality of pixels corresponding to intensity of incident light;
an irradiation control section that causes the light emitting section to radiate the detection light, the detection light being irradiated at a predetermined reference intensity or at least one discrimination intensity that is different from the reference intensity, wherein for a state in which (i) a number of pixels or a ratio of pixels have pixel values that are a discrimination reference value or more, the pixel values being output from the light receiving section when the detection light is irradiated at the reference intensity, and (ii) the number of pixels or the ratio of pixels is a first reference value or less, the irradiation control section causes the light emitting section to radiate the detection light at the at least one discrimination intensity, in which the at least one discrimination intensity is higher than the reference intensity;

a specification section that specifies pixels, of the plurality of pixels, whose pixel values output from the light receiving section have changed depending on a change in intensity of the incident light depending on whether the detection light is irradiated at the reference intensity or the at least one discrimination intensity; and an identification section that identifies an object by using a pixel value of the pixels specified by the specification section when the detection light is irradiated at the reference intensity.

2. An object detection device, comprising:

a light emitting section that radiates detection light;

a light receiving section that includes a plurality of pixels and outputs pixel values of respective pixels of the plurality of pixels corresponding to intensity of incident light;

an irradiation control section that causes the light emitting section to radiate the detection light, the detection light being irradiated at a predetermined reference intensity or at least one discrimination intensity that is different from the reference intensity, wherein for a state in which (i) a number of pixels or a ratio of pixels have pixel values that are a discrimination reference value or more, the pixel values being output from the light receiving section when the detection light is irradiated at the reference intensity, and (ii) the number of pixels or the ratio of pixels is more than a second reference value, the irradiation control section causes the light emitting section to radiate the detection light at the at least one the discrimination intensity, in which the at least one discrimination intensity is lower than the reference intensity;

a specification section that specifies pixels, of the plurality of pixels, whose pixel values output from the light receiving section have changed depending on a change in intensity of detection light depending on whether the detection light is irradiated at the predetermined reference intensity or the at least one discrimination intensity; and an identification section that identifies an object by using a pixel value, of the pixels specified by the specification section when the detection light is irradiated at the reference intensity.

3. The object detection device according to claim 2, wherein the irradiation control section causes the light emitting section to radiate the detection light with the discrimination intensity at predetermined time intervals.

4. The object detection device according to claim 1, wherein the irradiation control section causes the light emitting section to radiate the detection light with the discrimination intensity at predetermined time intervals.

5. An object detection method, comprising:

radiating detection light with a predetermined reference intensity;

radiating the detection light with at least one discrimination intensity that is different from the reference intensity, wherein for a state in which (i) a number of pixels or a ratio of pixels have pixel values that are a discrimination reference value or more, the pixel values being output from a light receiving section including a plurality of pixels when the detection light is irradiated at the reference intensity, and (ii) the number of pixels or the ratio of pixels is a first reference value or less, the detection light is radiated at the at least one discrimination intensity, in which the at least one discrimination intensity is higher than the reference intensity;

receiving incident light by the light receiving section, and specifying the pixels, of the plurality of pixels, whose pixel values have changed depending on a change in intensity of the incident light depending on whether the detection light is irradiated at the reference intensity or the at least one discrimination intensity; and identifying an object by using a pixel value of the specified pixels when the detection light is irradiated at the reference intensity.

* * * * *